United States Patent
Kato et al.

(10) Patent No.: US 6,397,277 B1
(45) Date of Patent: May 28, 2002

(54) METHOD AND APPARATUS FOR TRANSMITTING DATA OVER DATA BUS AT MAXIMUM SPEED

(75) Inventors: Junji Kato, Tokyo; Takehiko Nakano, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/315,092

(22) Filed: May 19, 1999

(30) Foreign Application Priority Data

May 20, 1998 (JP) .......................................... 10-138033

(51) Int. Cl.⁷ ............................. G06F 13/00; G06F 3/00
(52) U.S. Cl. ............................. 710/104; 710/8; 710/16; 710/60; 713/1; 713/100
(58) Field of Search ............................. 710/104, 8–19, 710/58–61; 713/1, 2, 100

(56) References Cited

U.S. PATENT DOCUMENTS

| | | | | |
|---|---|---|---|---|
| 5,023,869 A | * | 6/1991 | Grover et al. | 370/421 |
| 5,072,407 A | * | 12/1991 | Gutz et al. | 709/246 |
| 5,490,209 A | * | 2/1996 | Kennedy | 379/93.08 |
| 5,504,757 A | * | 4/1996 | Cook et al. | 370/468 |
| 5,509,126 A | * | 4/1996 | Oprescu et al. | 710/127 |
| 5,524,122 A | * | 6/1996 | Lepitre et al. | 375/222 |
| 5,559,967 A | * | 9/1996 | Oprescu et al. | 710/105 |
| 5,632,016 A | * | 5/1997 | Hoch et al. | 710/30 |
| 5,701,292 A | * | 12/1997 | Chiussi et al. | 370/232 |
| 5,724,517 A | * | 3/1998 | Cook et al. | 709/227 |
| 5,881,240 A | * | 3/1999 | Asano | 709/223 |
| 6,005,890 A | * | 12/1999 | Clow et al. | 375/221 |
| 6,035,425 A | * | 3/2000 | Caldwell et al. | 714/52 |
| 6,185,822 B1 | * | 2/2001 | Sato | 709/233 |

FOREIGN PATENT DOCUMENTS

| | | |
|---|---|---|
| EP | 0 637 150 | 2/1995 |
| EP | 0 697 778 | 2/1996 |
| EP | 0 834 815 | 4/1998 |
| EP | 0 959 590 | 11/1999 |

* cited by examiner

*Primary Examiner*—Sumati Lefkowitz
(74) *Attorney, Agent, or Firm*—Frommer Lawrence & Haug LLP; William S. Frommer; Glenn F. Savit

(57) ABSTRACT

A method and apparatus for transmitting data among devices connected to a serial data bus at maximum speeds are disclosed. Each device may be capable of transmitting data at several speeds. A transmitting device first transmits a data packet to a target recipient device at a maximum transmission speed of the transmitting device. If an acknowledgement signal confirming receipt of the initial data transmission is received from the target recipient, then the transmission speed for subsequent data packet transmissions's set to the speed of the just-transmitted data. Otherwise, the transmission speed is reduced and the process is repeated. Once an acknowledgement is received and the speed is set, the speed may be stored in a memory of the transmitting device for use in future communications with the recipient device. The process is repeated to establish maximum suitable transmission speeds to other target devices connected to the bus. The invention has particular utility when used in conjunction with an IEEE 1394 serial bus interface in the absence of a bus manager. Following a bus reset operation in which the memory of each device is cleared, individual devices reestablish appropriate data transmission speeds to each of the other devices by transmitting packets at varying speeds, if necessary, until acknowledgements are received.

24 Claims, 19 Drawing Sheets

FIG. 14

| PACKET ELEMENTS | NAMES | BIT LENGTHS | CONTENTS |
|---|---|---|---|
| RECEIVER ID | destination ID | 16 | RECEIVER NODE ID |
| TRANSACTION LABEL | tl | 6 | USED FOR COMPARISON REQUEST PACKET AND RESPONSE PACKET |
| RETRY CODE | rt | 2 | SPECIFY RETRANSMISSION METHOD |
| TRANSACTION CODE | tcode | 4 | SPECIFY PACKET TYPE AND TRANSACTION TYPE |
| PRIORITY | pri | 4 | NOT USED FOR CABLE CONNECTION |
| TRANSMITTER ID | source ID | 16 | TRANSMITTER NODE ID |
| PACKET-TYPE INFORMATION | | | |
| PACKET-TYPE DATA | | | |
| HEADER CRC | header CRC | 32 | CODE FOR DETECTING HEADER ERROR |
| DATA BLOCK | data field | | |
| DATA BLOCK CRC | data CRC | 32 | CODE FOR DETECTING DATA ERROR |

FIG. 15

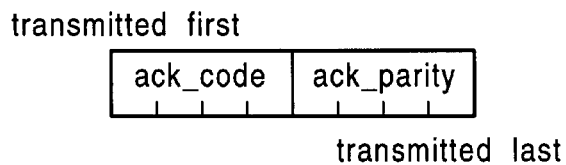

transmitted first

| ack_code | ack_parity | transmitted last

FIG. 16

| ack_complete | TRANSMITTER NODE SUCCEEDED IN PACKET RECEPTION. (NO RESPONSE FROM TRANS- ACTION LAYER) |
|---|---|
| ack_pending | TRANSMITTER NODE SUCCEEDED IN PACKET RECEPTION. (RESPONSE FROM TRANS- ACTION LAYER) |
| ack_busyX | TRANSMITTER NODE WAS UNABLE TO RECIEVE PACKETS. |
| ack_busyA | TRANSMITTER NODE WAS UNABLE TO RECIEVE PACKETS. |
| ack_busyB | TRANSMITTER NODE WAS UNABLE TO RECIEVE PACKETS. |
| ack_data_error | TRANSMITTER NODE WAS UNABLE TO VERIFY PACKET CRC. |
| ack_type_error | PACKETS HAVING CONTENTS OUT OF SUPPORT ARRIVED. |

METHOD AND APPARATUS FOR TRANSMITTING DATA OVER DATA BUS AT MAXIMUM SPEED

FIELD OF THE INVENTION

The present invention relates generally to data communications, and more particularly to a technique by which individual devices connected to a data bus can each transmit data to other devices at a maximum speed.

BACKGROUND OF THE INVENTION

As "smart" devices have proliferated in recent years, a trend is emerging in which everyday electronic devices such as video tape recorders (VTRs), televisions, personal computers, etc., can communicate with one another via connection to a common data bus. Among the many considerations in performing such data communication is the selection of appropriate data transmission speeds. When devices connected to a common bus have differing data communication speed capability, it is necessary to select a data transmission speed at which a transmitting end can transmit data and a receiving device can receive data. Moreover, if there is another apparatus (relay apparatus) between the transmitting and receiving devices, it is necessary to select a data transmission speed at which the relay apparatus can operate.

An international I/O connection standard, namely, the IEEE 1394-1995 serial bus standard, has been promulgated to provide a universal protocol for data communications over a serial bus. This standard defines a digital interface for data communications, thereby eliminating the need for an application to convert digital data to analog data before it is transmitted across the bus. Likewise, a receiving application will receive digital data from the bus rather than analog data, and will therefore not be required to perform A/D conversion.

The IEEE 1394 standard has been adopted to implement an inexpensive high-speed architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. An example of an application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. Multiple channels are provided for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

FIG. 19 is an arrangement of a number of devices with information processing capability connected to IEEE 1394 serial buses. In this example, IEEE 1394 serial buses 10-1 to 10-7 interconnect a personal computer (PC) 1, an integrated receiver/decoder (IRD) 2, a digital video tape recorder (digital VTR) 3, an editor 4, a MiniDisk (MD) deck 5, a monitor 6, a hard disk drive (HDD) 7 for storing image data and audio data, and a server 8. These devices satisfy the IEEE 1394 standard as well as the IEC 61883 standard providing audio-visual (AV) data transmission based on IEEE 1394. Each connected device constitutes a node (i.e., an accessible unit) in IEEE 1394, and each device has its own maximum data communication speed at which it is capable of performing data transmission and reception. According to the IEEE 1394 standard, the maximum speed for any given device can be either 98.308 Mbps, 196.608 Mbps or 392.216 Mbps, designated herein as speeds S100, S200 and S400, respectively. The maximum data communication speed for a particular device is, of course, dependent upon that device's hardware capabilities. A device can always transmit and receive data at lower speeds; for instance, a device having S400 capability can communicate at S100 or S200 if necessary. Data transmission based on S100 can be performed by all apparatuses satisfying the IEEE 1394 standard. When devices with different maximum communication speeds are connected to a common bus, a transmitting device must transmit at a transmission speed that can be relayed by another device operating as a relay.

FIG. 20 depicts illustrative maximum data communication speeds for the devices of FIG. 19. Thus, PC 1 has a maximum data communication speed of S400; editor 4 has a maximum speed of S200; and so forth. For example, both the MD deck 5 and the digital VTR 3 are S400 devices, and do not connect to an apparatus for transferring data between them, whereby they would always communicate with each other at S400 speed. On the other hand, if a slower device is operating as a relay for a faster device, the faster device cannot communicate through the relay device to other devices at its maximum speed capability. For instance, both the MD deck 5 and the PC 1 can transmit at S400, but since the receiver/decoder 2 with only S200 capability is connected therebetween in their transmission path, they can only communicate at S200 speed.

The IEEE 1394 serial bus standard defines a function called a "bus manager" which performs the services of: advanced bus power management; maintenance of a speed map of the data communication speed capabilities of the bus-connected devices; maintenance of a topological map of the connected devices; and bus optimization based on information obtained from the topological map. As part of the bus optimization, the bus manager determines the maximum speeds at which each device is able to transmit data in consideration of the current topology. The bus manager provides each device with maximum data transmission speed information in accordance with the optimization. Thus, a device connected to the IEEE 1394 serial bus sets, based on the information from the bus manager, a data transmission speed for transmission of data to a particular device connected to the bus. In this manner, communication is executed at a maximum data transmission speed enabling communication. When a new device is added to or removed from the bus, the speed map as well as the data speed information provided to the bus-connected devices are updated.

The IEEE 1394 standard also requires an entity called an isochronous resource manager. This entity functions to provide facilities for: allocation of isochronous bandwidth; allocation of channel numbers; and selection of a cycle master.

According to the IEEE 1394 serial bus standard, the existence of the bus manager is optional. However, if a bus manager is absent, the isochronous resource manager exercises a subset of the management responsibilities normally assumed by the bus manager. (The latter circumstance assumes that isochronous traffic is to take place. If there is no isochronous resource manager, no isochronous traffic is allowed.) In this case, if devices on the IEEE 1394 serial bus have S200 or higher speed capability, and a device acting as a relay also has S200 or higher capability, the devices must nevertheless perform initial communication based on S100 because they do not obtain information on a suitable data transmission speed to an apparatus at a receiving end. Thus, when no bus manager exists, a problem arises in that the devices connected to the IEEE 1394 serial bus use a minimum speed to perform data transmission.

SUMMARY OF THE INVENTION

It is an object of the present invention to provide a method for transmitting data among devices connected to a common data bus at maximum speeds.

It is another object of the invention to provide a method for transmitting data among devices connected to an IEEE 1394 serial data bus, even if no bus manager is present.

It is still another object of the invention to provide a device connectable to a data bus, which is capable of determining appropriate transmission speeds for transmission of data to other devices connected to the bus.

It is yet another object of the invention to provide an improved method for data communication on a data bus.

In accordance with an illustrative embodiment of the invention, there is provided a method and apparatus for transmitting data among devices connected to a data bus at maximum speeds. Each device may be capable of transmitting data at a number of speeds. A transmitting device first transmits a data packet onto the bus with ID information of a target recipient device, at the maximum transmission speed of the transmitting device. If an acknowledgement signal confirming receipt of the initial data transmission is received from the target recipient device, then the transmission speed for subsequent data transmissions to that device is set to the speed of the just-transmitted data. Otherwise, the transmission speed is reduced and the process is repeated. Once an acknowledgement is received and the speed is set, the speed may be stored in a memory of the transmitting device for use in subsequent data transmissions to the recipient device. The subsequent data transmissions may be asynchronous and/or isochronous data transmissions. The process is repeated to establish maximum suitable transmission speeds to other target recipient devices connected to the bus.

The invention has particular utility when used in conjunction with an IEEE 1394-1995 serial bus interface in the absence of a bus manager. Following a bus reset operation in which the memory of each device containing transmission speed information is cleared, individual devices reestablish appropriate data transmission speeds to each of the other devices by transmitting packets at varying speeds, if necessary, until an acknowledgement is received from each respective device.

BRIEF DESCRIPTION OF THE DRAWINGS

The following detailed description, given by way of example and not intended to limit the present invention solely thereto, will best be appreciated in conjunction with the accompanying drawings, in which like reference numerals denote like elements and parts, wherein:

FIG. 14 is a table illustrating main elements of an asynchronous packet;

FIG. 15 depicts an acknowledge-packet structure;

FIG. 16 is a table describing different acknowledgement codes of an asynchronous packet;

DETAILED DESCRIPTION OF PREFERRED EMBODIMENTS

Preferred embodiments of the present invention will now be described in the context of an apparatus and method for performing high speed data transmission on an IEEE 1394 serial bus. It is contemplated, however, that the invention may be practiced in conjunction with other data bus protocols. Thus, the following detailed description is for illustrative purposes only.

Figure 1:
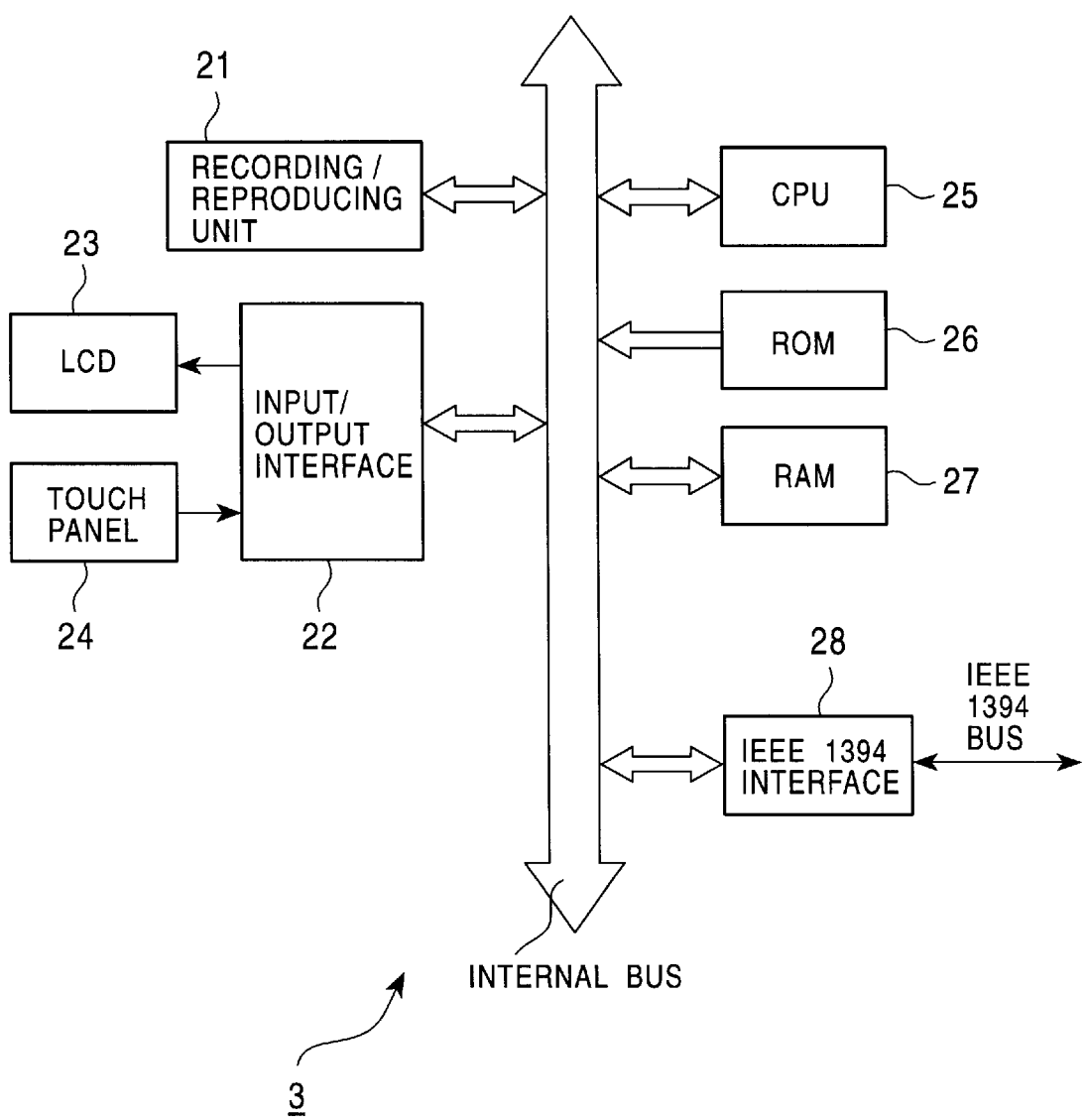
FIG. 1 is a block diagram of hardware within a digital VTR.

Referring now to FIG. 1, a function block diagram of a digital video tape recorder (VTR) 3 is shown. Digital VTR 3 will be described hereafter as, an illustrative information processing apparatus configured to transmit data at maximum speeds on a data bus to respective recipient devices in accordance with the invention. The means employed within VTR 3 to carry out the novel data communication technique, however, may be incorporated within any information processing apparatus connected to the bus.

VTR 3 includes a recording/reproducing unit 21 that records and reproduces data to/from a loaded videotape (not shown). A liquid crystal display (LCD) 23 and a touch panel 24 are connected to an internal bus via an input/output (I/O) interface 22. The LCD 23 displays display data supplied from the recording/reproducing unit 21, a central processing unit (CPU) 25, or an IEEE 1394 interface 28. The touch panel 24 supplies I/O interface 22 with a signal in accordance with an operation by a user.

Figure 19:
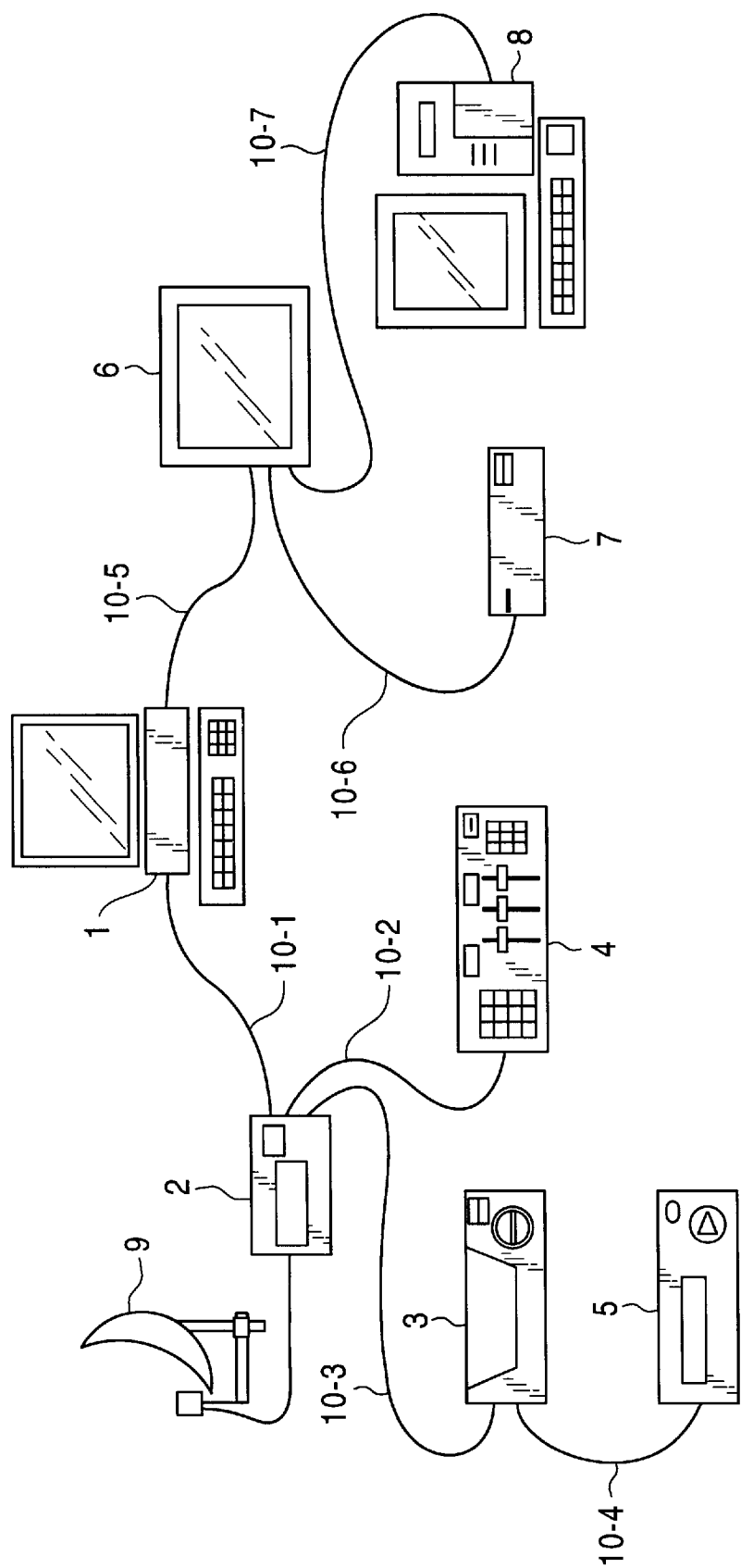
FIG. 19 shows an arrangement of various devices connected to IEEE 1394 serial buses.
Figure 20:
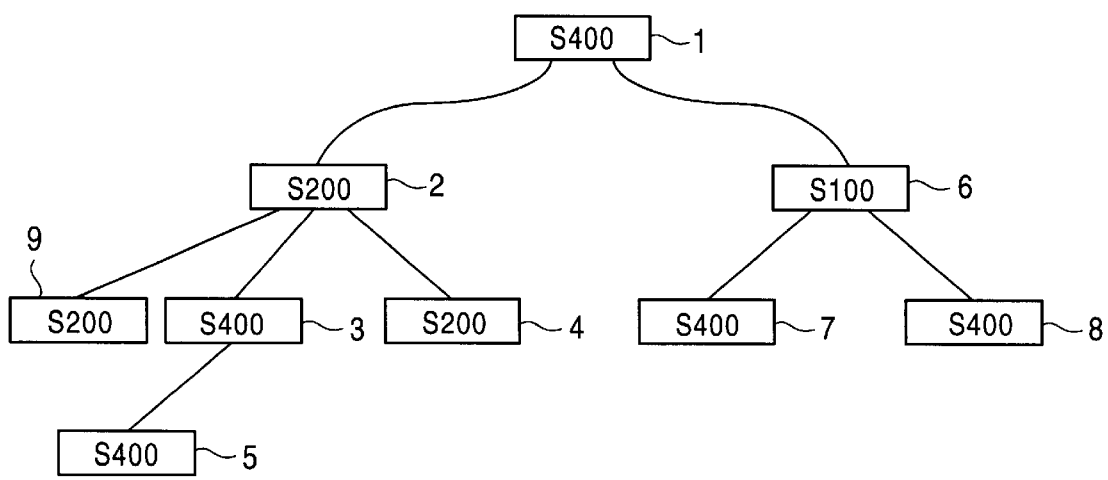
FIG. 20 depicts an arrangement of devices of various data speed capability connected to a bus.

CPU 25 executes various programs, including an application program to establish a suitable data transmission rate or rates for transmission of image, audio and other data to other devices connected to the bus. A read only memory (ROM) 26 stores fixed program data and operation parameters used by CPU 25. Random access memory (RAM) 27 stores programs executed by CPU 25 as well as parameters that necessarily change during program execution. Interface 28 is an I/O interface configured in accordance with the IEEE 1394 standard, and transfers data between the internal bus and one or more external IEEE 1394 serial buses. (It is noted that when a plurality of buses such as 10-3 and 10-4 of FIG. 19 are connected to the same device, the plurality of buses may be considered as part of a common bus.) The internal bus is the vehicle by which data is transferred among I/O interfaces 22 and 28, recording/reproducing unit 21, CPU 25, ROM 26 and RAM 27.

Figure 2:
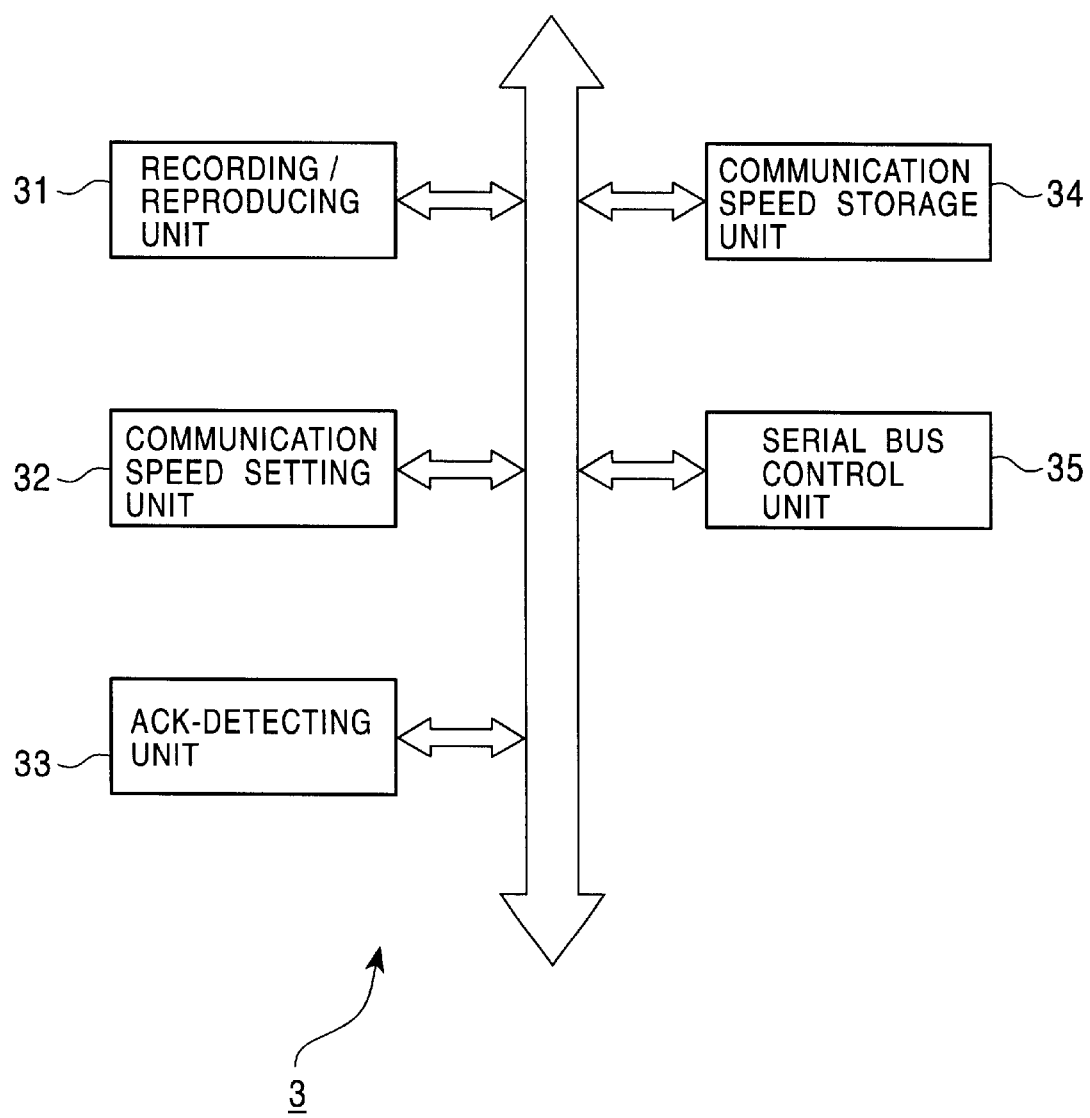
FIG. 2 is a functional block diagram of a digital VTR according to an embodiment of the present invention.

FIG. 2 is a functional block diagram of a program that is executed mainly by CPU 25 in the digital VTR 3 (or other apparatus connected to the serial bus) having the above-described hardware. Recording/reproducing unit 21 controls recording and reproduction of data to/from a mass media storage unit, e.g., a videotape in this example. A communication speed setting unit (transmission speed setting means) 32 selects a predetermined transmission speed from among transmission speeds 98.308 Mbps, 196.608 Mbps, and 392.216 Mbps for data transmission to a target receiving end device connected to the bus. Speed setting unit 32 requests a serial bus control unit (data transmission means) 35 to perform the data transmission at the selected transmission speed. An acknowledgement (ACK) detecting unit 33 (detecting means) detects an acknowledgement signal from the target receiving end device, which is sent to confirm receipt of a data transmission to that device by the VTR 3. Based on the reception signal detected by the ACK-detecting unit 33, the communication speed setting unit 32 determines whether data can be transmitted to the target receiving end device at the transmission speed at which packets were transmitted.

A communication speed storage unit 34 (transmission speed storage means) stores a list of maximum transmission speeds corresponding to the various devices connected to the bus. Each stored speed represents the speed at which data can be suitably transmitted by VTR 3 to the associated device. The speeds are determined by speed setting unit 32 based on the acknowledgement signals sent from the respective reception devices. Speed storage unit 34 clears the stored information when the IEEE 1394 serial bus is "reconfigured" or "reset". (According to the IEEE 1394 standard, the bus is automatically reset whenever a device is added to or removed from the bus.) The serial bus controller 35 has a communication procedure based on IEEE 1394, and transmits data to other apparatuses connected to the IEEE 1394 serial bus, or receives data and confirmation signals from the other apparatuses connected to the IEEE 1394 serial bus.

A preferred method by which a data transmission speed to a target reception device is determined by speed setting unit 32 will be described later with reference to FIGS. 17 and 18. Briefly, the preferred method entails first transmitting data to a target recipient device at the maximum transmission speed of the transmitting device, VTR 3 in this example. If an acknowledgement to the initial data transmission is received from the target reception device, then the selected transmission speed is the maximum speed (e.g., speed S400); otherwise, the next lower speed (S200) is selected as a candidate and an attempted data transmission is performed at S200. If an acknowledgement is received to the lower data speed transmission, then S200 is selected as the speed for future data transmissions; otherwise, speed S100 is selected. The process is repeated when a transmission is attempted to another target device. Accordingly, maximum data communication speeds are set in an efficient manner without the need for a bus manager to provide the speed information.

IEEE 1394 Communication Protocol

For a better understanding of the applicability of the present invention to devices that communicate in accordance with the IEEE 1394 protocol, certain aspects of this protocol will now be described. Embodiments of a data communication method of the invention will be presented subsequently.

Figure 3:
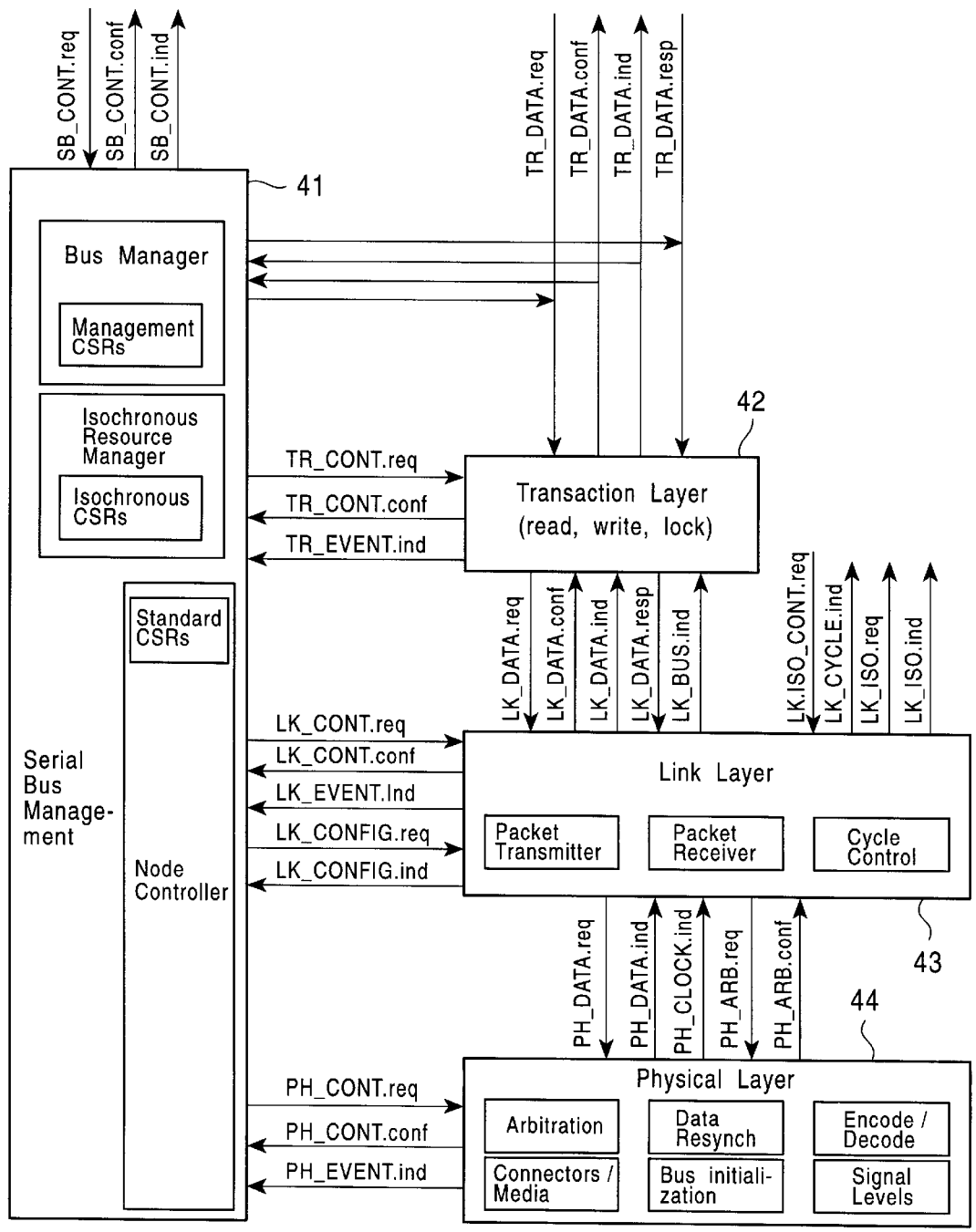
FIG. 3 is a block diagram illustrating functions performed in accordance with the IEEE 1394 protocol.

FIG. 3 is a block diagram illustrating a functional layer structure in accordance with the IEEE 1394 protocol. The protocol defines a hierarchical structure comprised of three layers—a transaction layer 42, a link layer 43, and a physical layer 44. The three layers can be considered to exist in each node connected to the serial bus. The layers communicate with one another, and each layer may communicate with an optional serial bus management entity 41. The transaction layer 42 and the link layer 43 each communicate with another functional block (e.g., the recording/reproducing unit 31 shown in FIG. 2). There are four types of transmission/reception messages used in this communication: a request; an indication; a response; and a confirmation. The arrows shown in FIG. 3 represent these communications. Each communication in which ".req" is added to the end of an arrow name represents a request. Similarly, ".ind" represents an indication, ".resp" represents a response, and ".conf" represents a confirmation. For example, "TR_CONT.req" represents a request communication sent from the serial bus management 41 to the transaction layer 42.

The transaction layer 42 satisfies a request response protocol required in the ISO/IEC 13213 standard by providing, in response to a request from another functional block (e.g., the communication speed setting unit 32 shown in FIG. 2), asynchronous data transmission to a target device connected to the bus. The transaction layer 42 processes data for asynchronous transmission, but does not perform processing for isochronous transmission for transmitting data such as images and sound. In accordance with the transaction layer 42 protocol, data is transmitted asynchronously among devices using three transactions—a read transaction, a write transaction, and a lock transaction. The lock transaction is used to eliminate a problem caused by a split transaction consisting of two or more packet transmissions in the link layer 43.

The link layer 43 performs operations such as data transmission using acknowledge-signals, confirmation of data errors, and data framing. A request for isochronous data transmission service from another functional block (e.g., the recording/reproducing unit 31 shown in FIG. 2) is made to the link layer 43. Transmission of one packet by the link layer 43 is called a "subaction". There are two types of subactions—an asynchronous subaction and an isochronous subaction. In an asynchronous subaction that transmits node identification (node ID) data specifying a node and an address in the node, the node that received data responds using an acknowledge-signal. In an isochronous broadcast subaction that sends data to all nodes in the IEEE 1394 serial bus, nodes receiving data do not respond using an acknowledge-signal. Data in the isochronous subaction is transmitted periodically at a constant cycle, within a selected channel, and no acknowledge-signal is used for a response.

Figure 4:
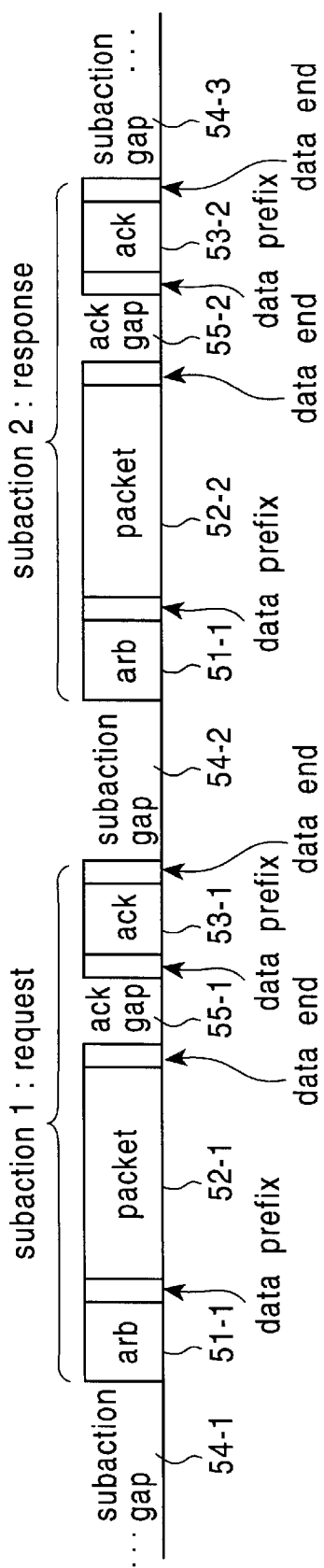
FIG. 4 is a diagram showing an asynchronous subaction structure.

FIG. 4 is a diagram showing an arrangement of asynchronous subactions specifying node IDs and addresses in the nodes. In this example, during the time period denoted as "subaction 1:request", a first predetermined node transfers a packet to request a second predetermined node to perform a read or write operation. In the interval denoted as "subaction 2:response", the second node responds to the request from the first node. The asynchronous subactions consist of arbitration sequences 51-1 and 51-2, data packet transmissions 52-1 and 52-2, and acknowledgments 53-1 and 53-2. A node that wants to transfer an asynchronous packet requests the physical layer 44 in an arbitration sequence period such as 51-1 or 51-2 to control the IEEE 1394 serial bus. A node that succeeds at arbitration transfers an asynchronous packet in a data packet transmission period as 52-1 or 52-2. A node that received the asynchronous packet specifying its receiver node ID sends an acknowledge-signal in an acknowledgment period as 53-1 or 53-2 to the node that transmitted the packet. The asynchronous subactions are divided by periods called "subaction gaps" 54-1 to 54-3. The data packet transmissions 52-1 and 52-2, and the associated acknowledgments 53-1 and 53-2 are divided by periods called "ACK gaps" 55-1 and 55-2.

Figure 5:
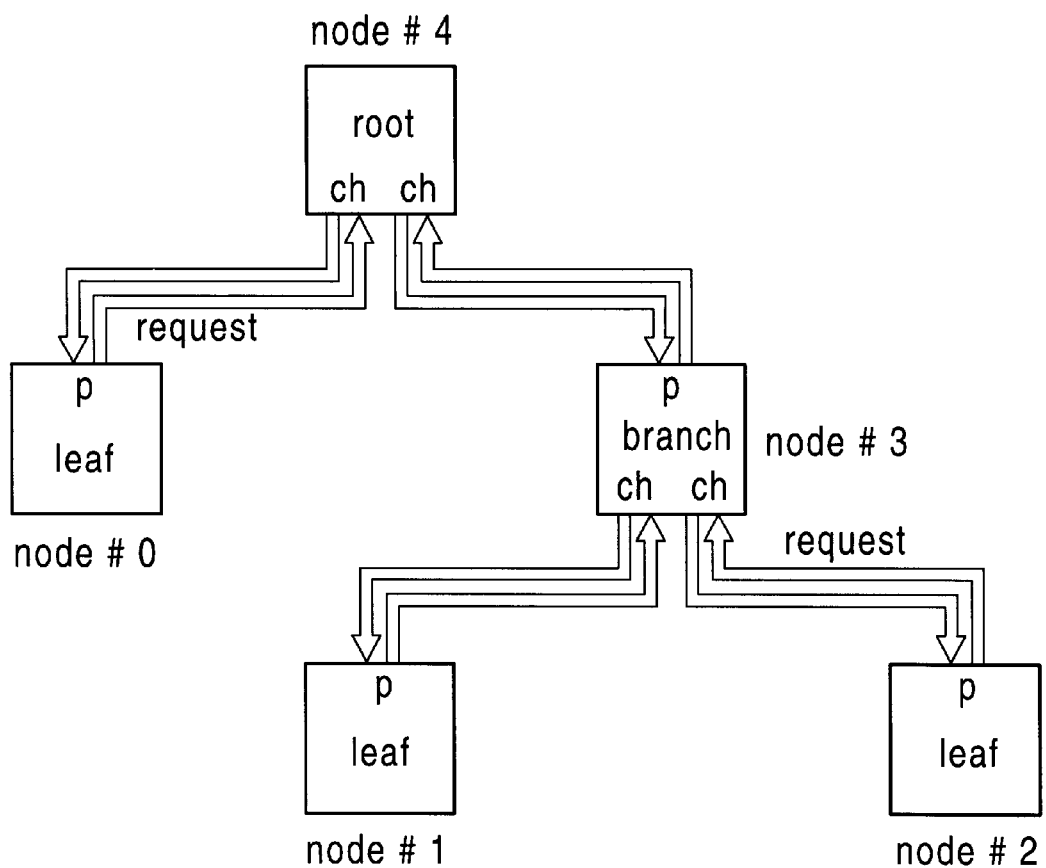
FIG. 5 is a block diagram showing the condition of nodes initiating arbitration.

The operation of the physical layer 44 of each node in the period of arbitration sequences 51-1 and 51-2 will now be described with reference to FIGS. 5–9. FIG. 5 illustrates a condition of nodes connected to the IEEE 1394 serial bus, with certain nodes requesting data transmission and initiating arbitration. (The connection condition in FIG. 5 differs from that shown in FIG. 19.) It is assumed that after detecting subaction gaps, nodes #0 and #2 simultaneously output request signals to their parent nodes, i.e., nodes #4 and #3, respectively. Whenever a parent node (first parent) receives a request from a child node, the parent node outputs the request to its parent node (second parent), if one exists, unless another child of the first parent had already made a request. That is, the first parent outputs the request from the child that made the request first, and simultaneously sends a deny signal to the other child nodes.

Figure 6:
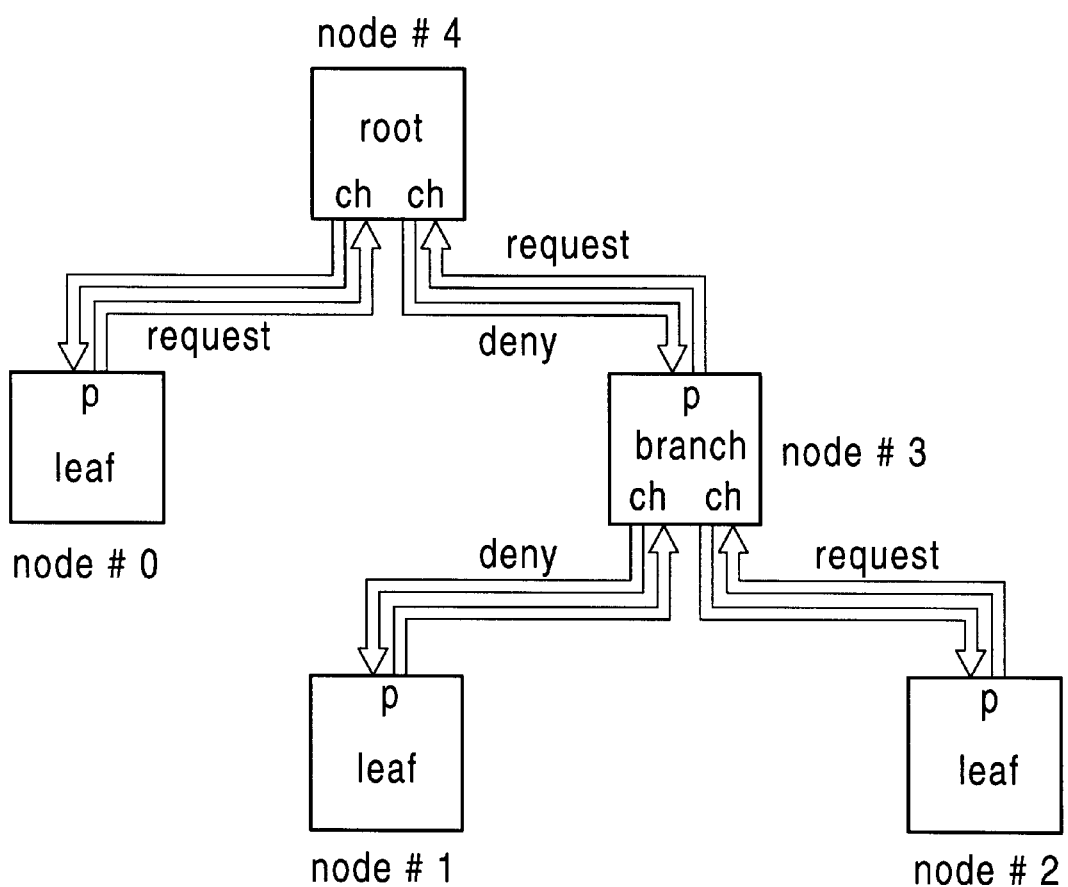
FIG. 6 illustrates the operation of a node that received a request signal.

Therefore, as shown in FIG. 6, since node #3 received a request signal from node #2, it routes this request to its parent, node #4, and simultaneously sends a deny signal to its other child, node #1. By way of example, in the case where a request from node #0 reaches node #4 earlier than the request from node #3 (which stems from the node #2 request), node #4 outputs a deny-signal to node #3. It is noted here that in this example, nodes #0, #1 and #2 are designated as leaf nodes because they connect to only one other node. Node #3 is a branch node and node #4 is a root node. In general, the selection of the root node is not topology dependent, and it is even acceptable for the root node to also be a leaf. The standard requires, however, that the isochronous cycle master also has to be the root, since the root has the highest natural priority. Also, the node that has all of its connected ports identified as children becomes the root.

Figure 7:
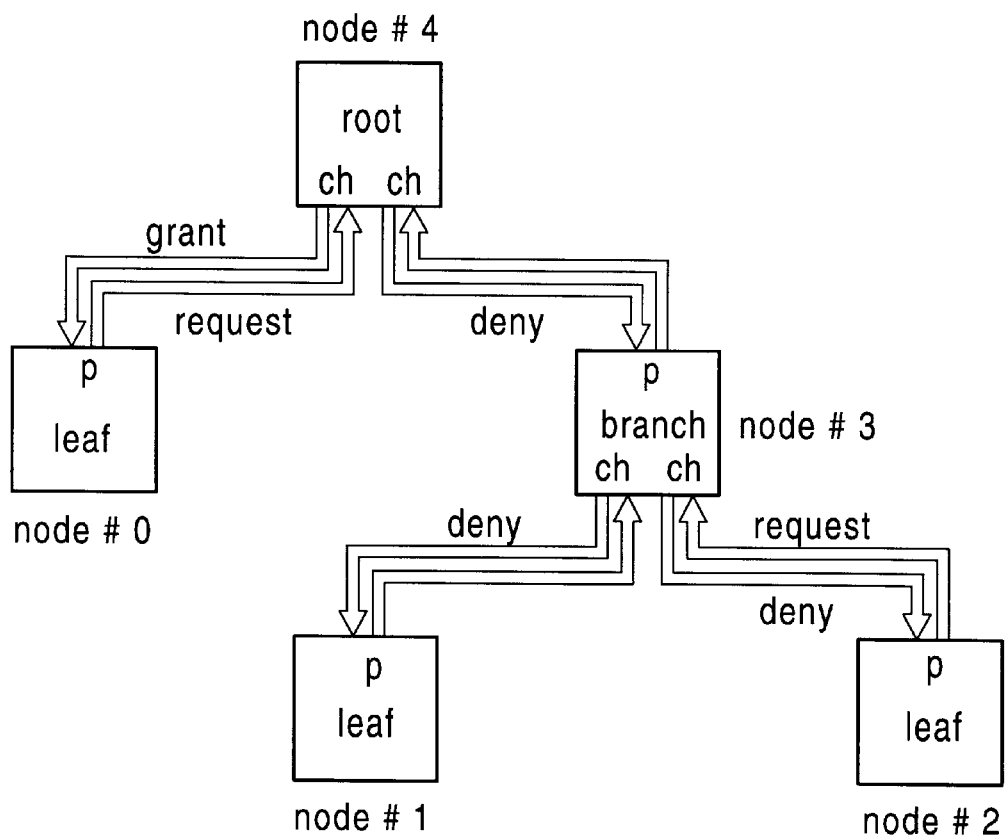
FIG. 7 is a block diagram illustrating the operation of a node as a root when it outputs a grant-signal.
Figure 8:
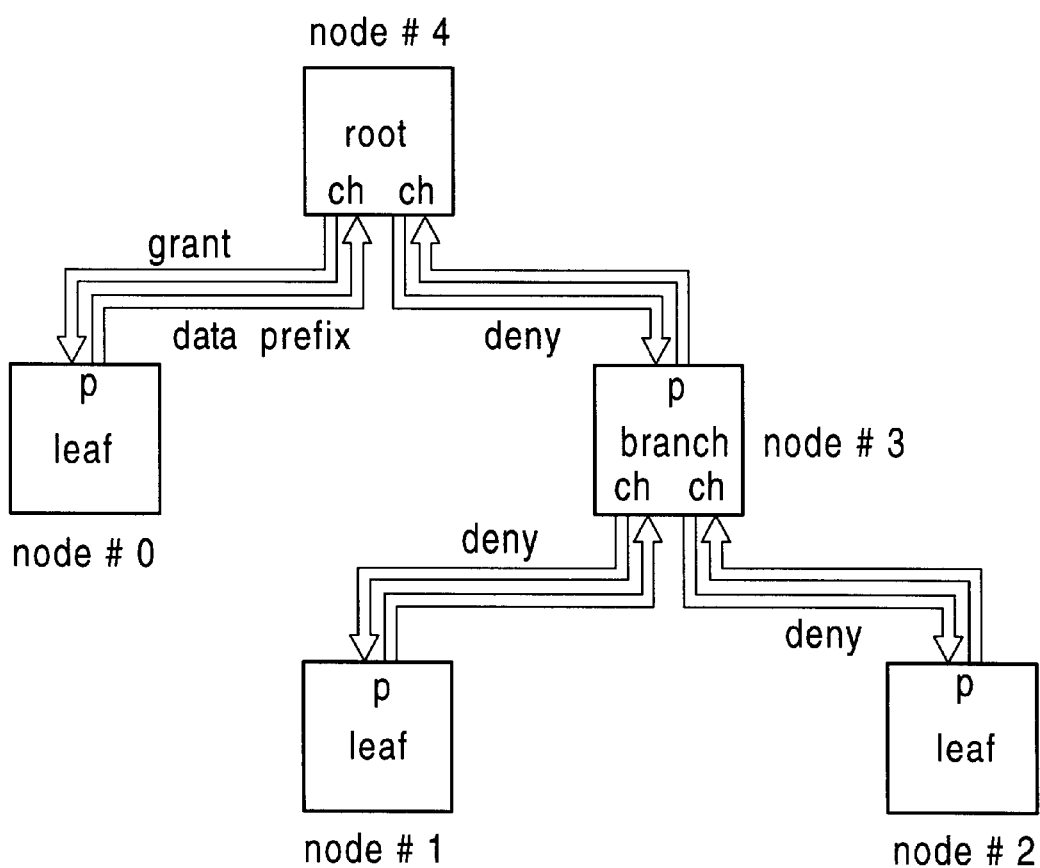
FIG. 8 illustrates the operation of a node that received a grant-signal, and the operation of a node that received a deny-signal.

As shown in FIG. 7, node #4 as a root outputs a grant-signal to node #0, which had output the earliest request signal. When a root node provides a grant signal to one of its children, it simultaneously outputs deny-signals to the remainder of its children. As such, root node #4 sends a deny-signal to the branch node #3 in the current example. Branch node #3, upon receiving this deny-signal, discontinues the output of the request signal to the root node, and sends deny-signals to each of its children, nodes #1 and #2. Node #2, upon receiving the deny signal, terminates the output of its request signal as shown in FIG. 8.

Figure 9:
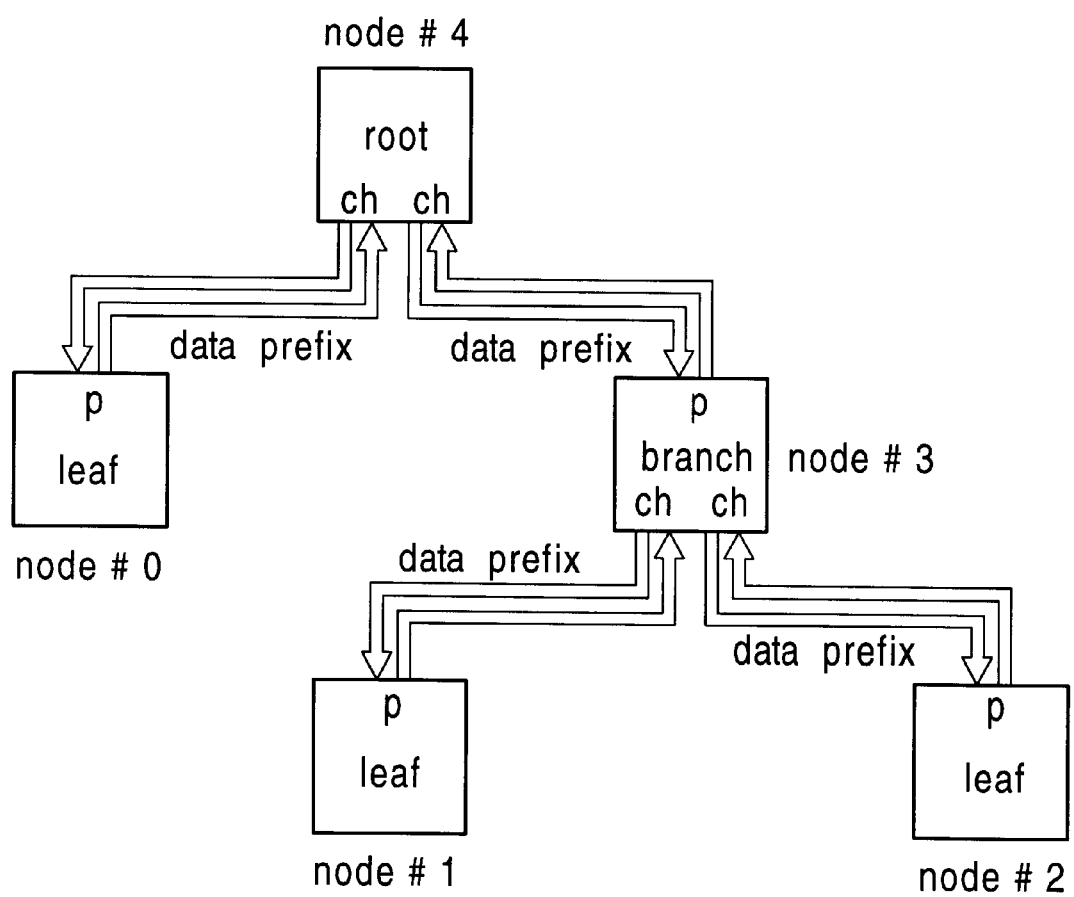
FIG. 9 is a block diagram illustrating the condition of a node when it initiates data transmission.

A node that receives a grant-signal in response to its request signal changes the request signal to a data prefix signal. In the current example, as shown in FIG. 8, node #0 changes the request signal to a data prefix signal upon reception of the grant signal from the root node #4. When node #4 receives this data prefix signal, it terminates the output of the grant-signal, as illustrated in FIG. 9. A deny signal and a data prefix signal function similarly, in that whenever a node receives either a deny signal or a data prefix signal, it enters a receiving mode. Hence, nodes #1 to #4 are all in their receiving modes before node #0 initiates data transmission. Data output from node #0 is transmitted to all the nodes along the data prefix signal direction shown in FIG. 9.

Figure 10:
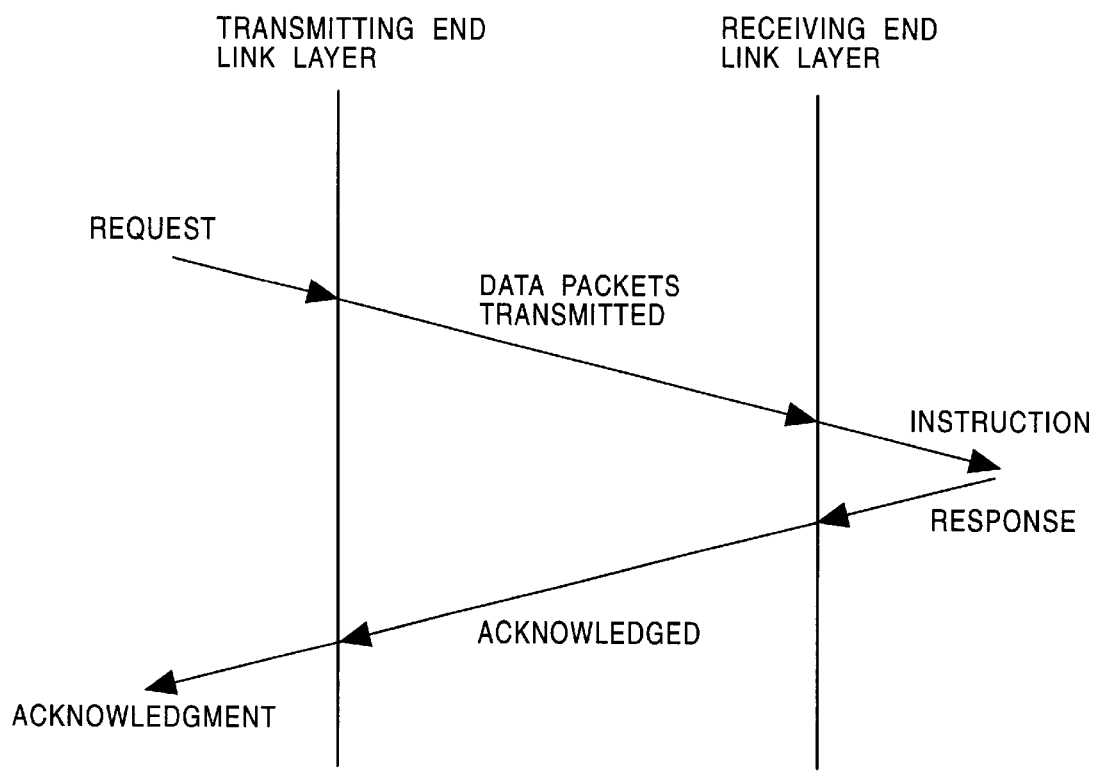
FIG. 10 illustrates message transmission and reception between link layers during asynchronous communication.

FIG. 10 illustrates the operation of the link layers 43 when they perform asynchronous message transmission and reception, in which node IDs and node addresses are specified. The transaction layer 42 of a transmitting node transmits a request message to that node's link layer 43. The transmitting node link layer 43 then transmits data packets to the target receiving node's link layer 43 via the physical layers of the transmitting and receiving nodes and the IEEE 1394 serial bus. Next, the receiving end link layer 43 sends an instruction message to the receiving end transaction layer 42, which in turn acknowledges receipt of the original request by transmitting an acknowledgement 53-1 back to the transmitting end link layer via the physical layers and the serial bus. The transmitting end link layer 43 responds to the acknowledgment by transmitting a confirmation message to the transmitting end transaction layer 42.

Thus, in the above-described manner, when the transmitting end node receives an acknowledgement, it knows that data communication with the intended recipient node has been established, and can proceed asynchronously. On the other hand, when the transmitting end cannot detect acknowledgment, it determines that the case is ACK missing, meaning that the attempted communication has failed.

Figure 11:
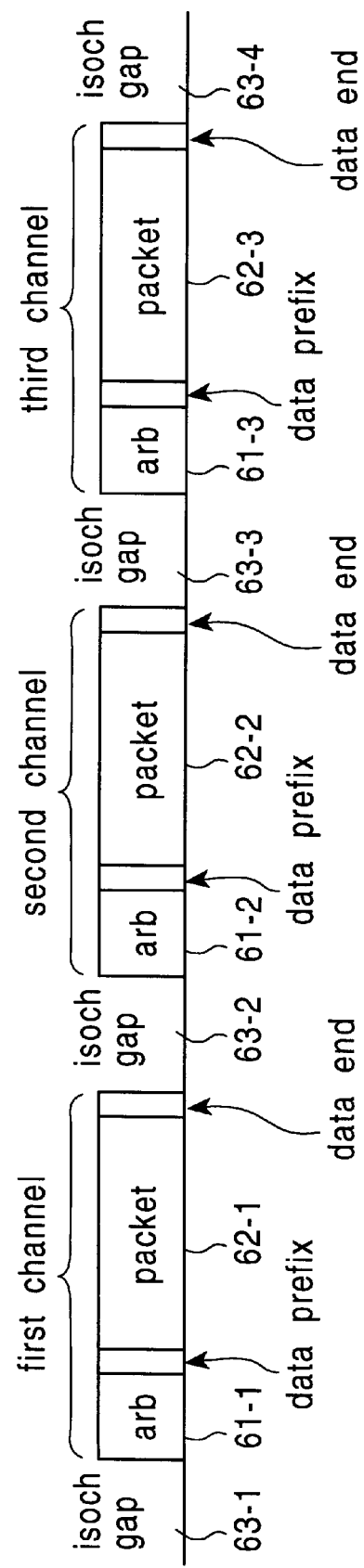
FIG. 11 is a diagram showing an isochronous subaction structure.

Turning now to FIG. 11, a timing diagram illustrating isochronous subactions is presented. Isochronous data transmission is performed in packets, with each packet transmitted during a specific time slot or "channel", e.g., the first to third channels depicted. Consecutive channels such as the first and second channels can support data packet transmission either by different nodes or by the same node. The isochronous subactions consist of arbitration sequences 61-1 to 61-3 and data packet transmissions 62-1 to 62-3 in the respective channels. A node that wants to transmit isochronous packets requests its physical layer 44 to control the IEEE 1394 serial bus in an arbitration sequence period. The operation of each node in the isochronous subaction is identical to the above-described operation of a node in the asynchronous subaction.

A transmitting node that succeeds at arbitration during an arbitration sequence as 61-1 immediately transmits a data prefix and an isochronous data packet as 62-1 in the succeeding time period. The isochronous subactions are divided by isochronous gaps 63-1 to 63-4, which are shorter than the above-discussed asynchronous subaction gaps 54-1 to 54-3 of FIG. 4. A node that desires to transmit data isochronously will immediately arbitrate for the bus following the detection of an isochronous gap. A node desiring to transmit data asynchronously must wait for an asynchronous gap to occur. Since the isochronous gap is shorter than the asynchronous gap, this gives priority to isochronous communication over asynchronous communication.

Figure 12:
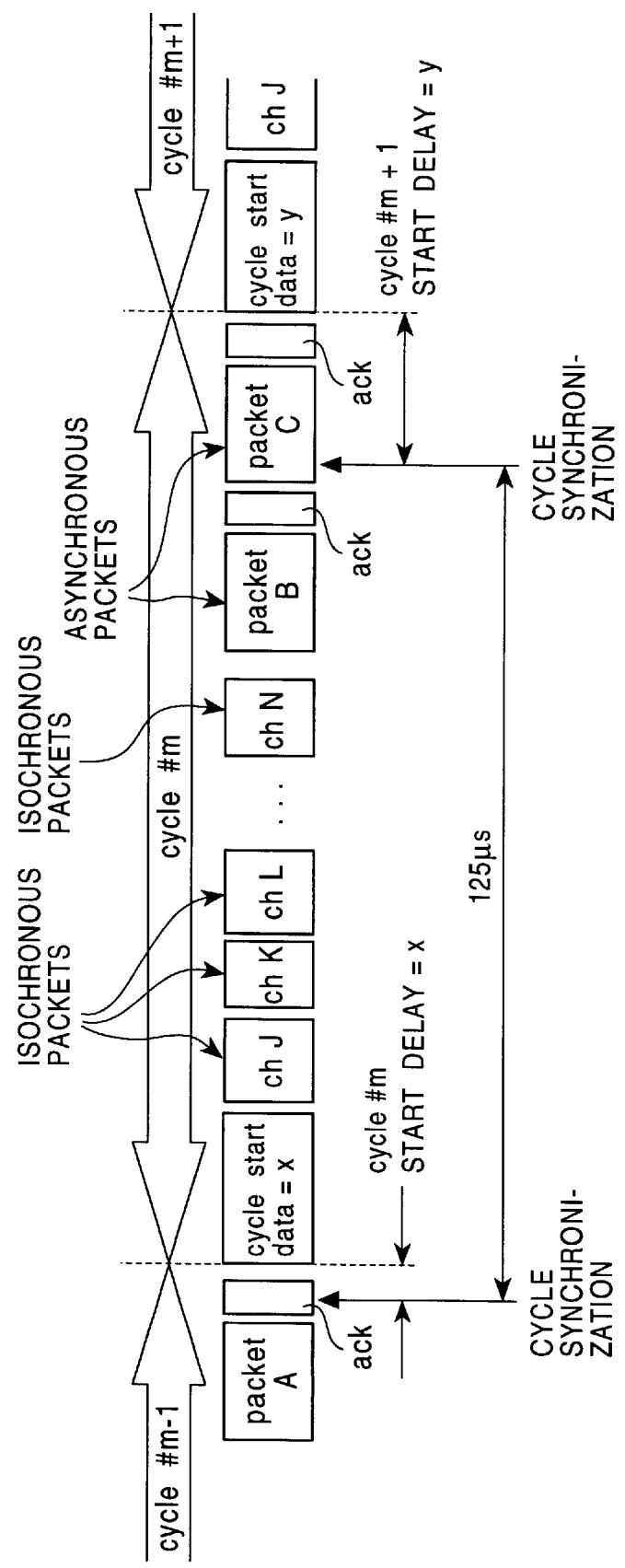
FIG. 12 illustrates a cycle of data transmission among apparatuses connected based on IEEE 1394.

FIG. 12 is a diagram depicting a cycle of data transmission among apparatuses connected based on the IEEE 1394 standard. Data is divided into packets and transmitted using a 125 μs cycle as a reference. This cycle is created based on a cycle start signal supplied from a node having a cycle master function. An isochronous packet reserves a band (i.e., time slot) necessary for transmission from the start of all cycles. Therefore, for isochronous transmission, data transmission in a constant time interval from the start of the cycle is guaranteed. However, if a transmission error occurs, data is lost because no protection system is used. Once all nodes that desire to transmit data isochronously have done so, e.g., in channels J to N, the bus will stay idle long enough for an asynchronous subaction gap to appear. When this occurs, a node desiring to transmit asynchronous data can arbitrate for the bus and then transmit an asynchronous packet when arbitration succeeds. Asynchronous transmission uses acknowledge- and retry-signals to guarantee secure transmission, but cannot set transmission timing to be constant.

Returning to FIG. 3, the physical layer 44 converts logical symbols used in the link layer 43 into electrical signals. The physical layer 44 uses arbitration to ensure that only one node initiates data transmission. It executes the reconfiguration of the IEEE 1394 serial bus in accordance with bus resetting, and automatically assigns physical IDs.

The serial bus management entity 41 realizes basic bus-control functions, and provides the Control & Status Register Architecture (CSR) of the ISO/IEC 13212 standard. Serial bus management entity 41 has the functions of a node controller, an isochronous resource manager, and a bus manager. The node controller controls node condition, node IDs, etc., and controls the transaction layer 42, the link layer 43, and the physical layer 44. To perform isochronous communication, at least one of the devices connected to the IEEE 1394 serial bus must have the isochronous resource manager function. The bus manager is the highest function of the respective functions, and its object is to optimally use the IEEE 1394 serial bus. The existence of the isochronous resource manager and the bus manager is optional. However, according to the standard, if there is no bus manager, the isochronous resource manager exercises a subset of the management responsibilities normally assumed by the bus manager. Of course, if the isochronous resource manager is absent as well, only asynchronous data communication can be carried out.

Figure 13:
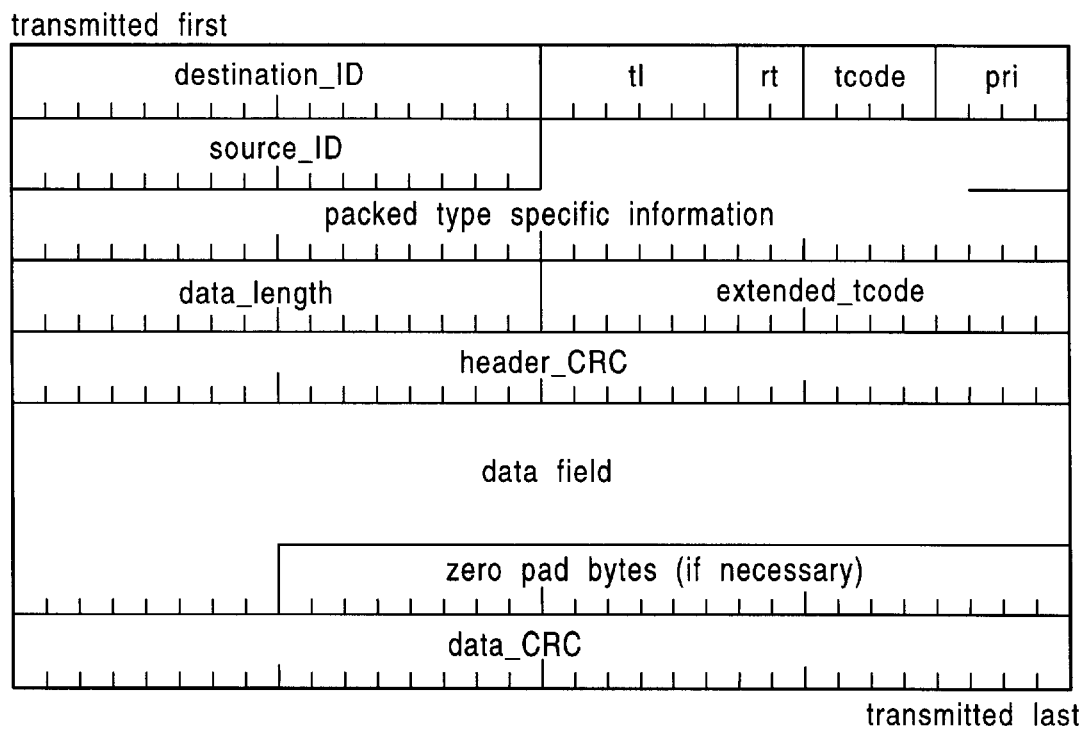
FIG. 13 depicts an example of an asynchronous packet structure.

Referring now to FIG. 13, an exemplary structure of an asynchronous packet 52-1 or 52-2 is shown. The packet begins with a destination_ID which is the ID of the intended receiving node, and ends with a data_CRC field. The asynchronous packet is used to write data sent as a payload to an address beginning with a predetermined offset receiver address. The characteristics of various elements of an asynchronous packet are presented in the table of FIG. 14. The items listed in the column under the header "NAMES" correspond to the names of the asynchronous packet elements shown in FIG. 13. The "CONTENTS" column provides a short description of each element. A node that may receive an asynchronous packet reads information stored in the receiver ID. When the read ID matches the ID of the node, the node proceeds to receive the contents of the asynchronous packet. The receiving node then responds to the transmitting node based on the information stored in the transmitter ID by sending an acknowledge-packet to the transmitting node (that transmitted the asynchronous packet).

FIG. 15 illustrates the structure of an acknowledge-packet 53-1 or 53-2 of FIG. 4. The four least significant bits of the acknowledge-packet are allocated for parity bits. The four most significant bits of the packet are used as an "ack_code". Depending on its code value, the ack_code indicates one of the following conditions: completion; pending; three types of busy; or two types of data error. These conditions are explained with reference to FIG. 16. A node at a transmitting end transmits an asynchronous packet to a predetermined node at a receiving end at a predetermined data transmission speed. When the transmitting end receives a packet with any one of the ack-codes shown in FIG. 16 from the receiving end, it determines that data transmission to the node at the receiving end node can be performed. (The receiving end node is denoted as "Transmitter Node" in FIG. 16.) When the receiving end node transmits an asynchronous packet including any one of the ack_codes shown in FIG. 16, this indicates that the receiving end node recognized the received asynchronous packet and supports the transmission speed of the asynchronous packet. As mentioned earlier, according to the IEEE 1394 standard, if a bus manager is present, it maintains a speed map for the current topology of interconnected nodes, and supplies the predetermined speed information to each of the nodes. In the absence of a bus manager, the predetermined speed at which each node transmits data is the minimum speed, S100.

Embodiments of Data Transmission Speed Optimization Method

Figure 17:
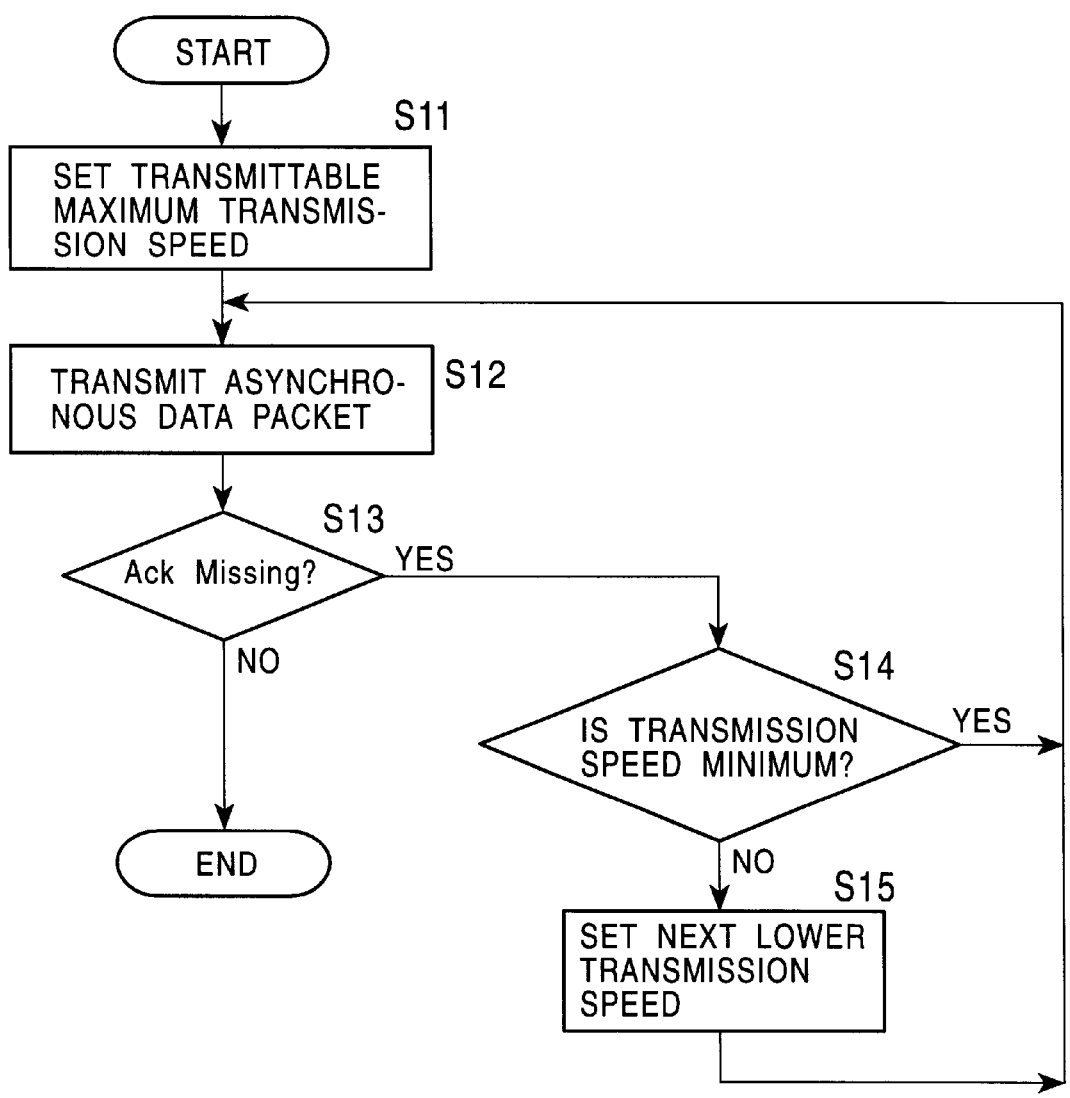
FIG. 17 is a flowchart illustrating a process for transmitting data by a transmitting end device to a receiving end device connected to a bus in accordance with the present invention.

FIG. 17 is a flowchart illustrating an embodiment of a method for transmitting data among devices connected to a data bus at maximum speeds in accordance with the present invention. This embodiment has particular utility for environments in which a bus manager is absent. If a bus manager is present, this method would preferably supersede the standard technique of the bus manager supplying each node with predetermined speeds at which to transmit data. The method disclosed herein involves the transmission of an asynchronous packet to a target recipient device at a maximum speed. If a suitable acknowledgement is received, subsequent data transmission to the recipient device, i.e., asynchronous and/or isochronous, is performed at the maximum speed. Otherwise, the transmission speed is gradually lowered until a suitable acknowledgement is received.

By way of example to illustrate the method, it is assumed that the digital VTR 3 of FIGS. 1 and 2 is connected to a data bus such as an IEEE 1394 bus, and desires to transmit data to a target recipient device (node) connected to the bus. It is understood, however, that any type of device connected to the serial bus can practice the method with suitable software and/or hardware to implement the respective functions.

In step S11, the communication speed setting unit 32 requests the serial bus controller 35 to set a maximum transmission speed at which transmission can be performed. Thus, for example, if the transmitting node is capable of S400 speed, the speed will initially set to S400 regardless of the topology of the nodes connected to the bus. In step S12, the serial bus controller 35 transmits an asynchronous packet to the target recipient device at the set transmission speed by including the target device's node ID, etc., in the packet transmission. This asynchronous packet may be the same as packet 52-1 of FIG. 4 in the IEEE 1394 based system, and would follow a successful arbitration 51-1. In step S13, the ACK-detecting unit 33 determines whether an acknowledge-packet has been received from the target recipient device. Successful receipt of an acknowledge-packet may be detected, for example, if a packet is received with one of the ack-codes in FIG. 16. If a suitable acknowledge-packet has been received, the process ends because the apparatus at the receiving end received the asynchronous data packet. In this circumstance, the transmission speed for subsequent data transmission from the VTR 3 to the recipient device is set at the speed of the packet that was acknowledged (i.e., S400 in this example if an acknowledgment is received in response to the maximum speed transmission).

If in step S13 no acknowledge-packet is received, the ACK-detecting unit 33 sends, to the communication speed setting unit 32, an Ack-missing message indicating that no response was received from the target recipient. When communication speed setting unit 32 receives this message, it determines whether or not the present transmission speed set by the serial bus controller 35 is a minimum value (98.308 Mbps based on S100). If not, the routine flows to step S15 where the communication speed setting unit 32 requests the serial bus controller 35 to set the next lower transmission speed, e.g., 196.608 Mbps (S200). Once the lower transmission speed is set, the routine proceeds to step S12, and the process is repeated.

If in step S14 the present transmission speed is minimum, the routine returns to step S12, and the process is performed again at the minimum speed as a retry operation. After a prescribed number of retries at the minimum speed, a communication failure error message is typically generated.

In the above example, it was assumed that the transmission speed is lowered after only one data transmission attempt at a particular transmission speed. This approach can be modified by allowing two or more attempts at each speed before reducing the speed.

As described above, in accordance with the above embodiment, a device such as the digital VTR 3 connected to a serial data bus can perform data transmission to a predetermined apparatus on the bus at a maximum transmission speed at which data transmission can be performed. When the transmitting device desires to transmit data to a second recipient device, the method of FIG. 17 is preferably repeated for the second device. It is noted that in the method of FIG. 17, once data transmission to a target recipient device is completed at the set speed, the speed information for that recipient device can be either stored for future data transmission to that device (assuming no changes to the node connection topology), or, erased. In the latter case, the process of FIG. 17 is repeated each time a data transmission to the target device is to be performed.

Figure 18:
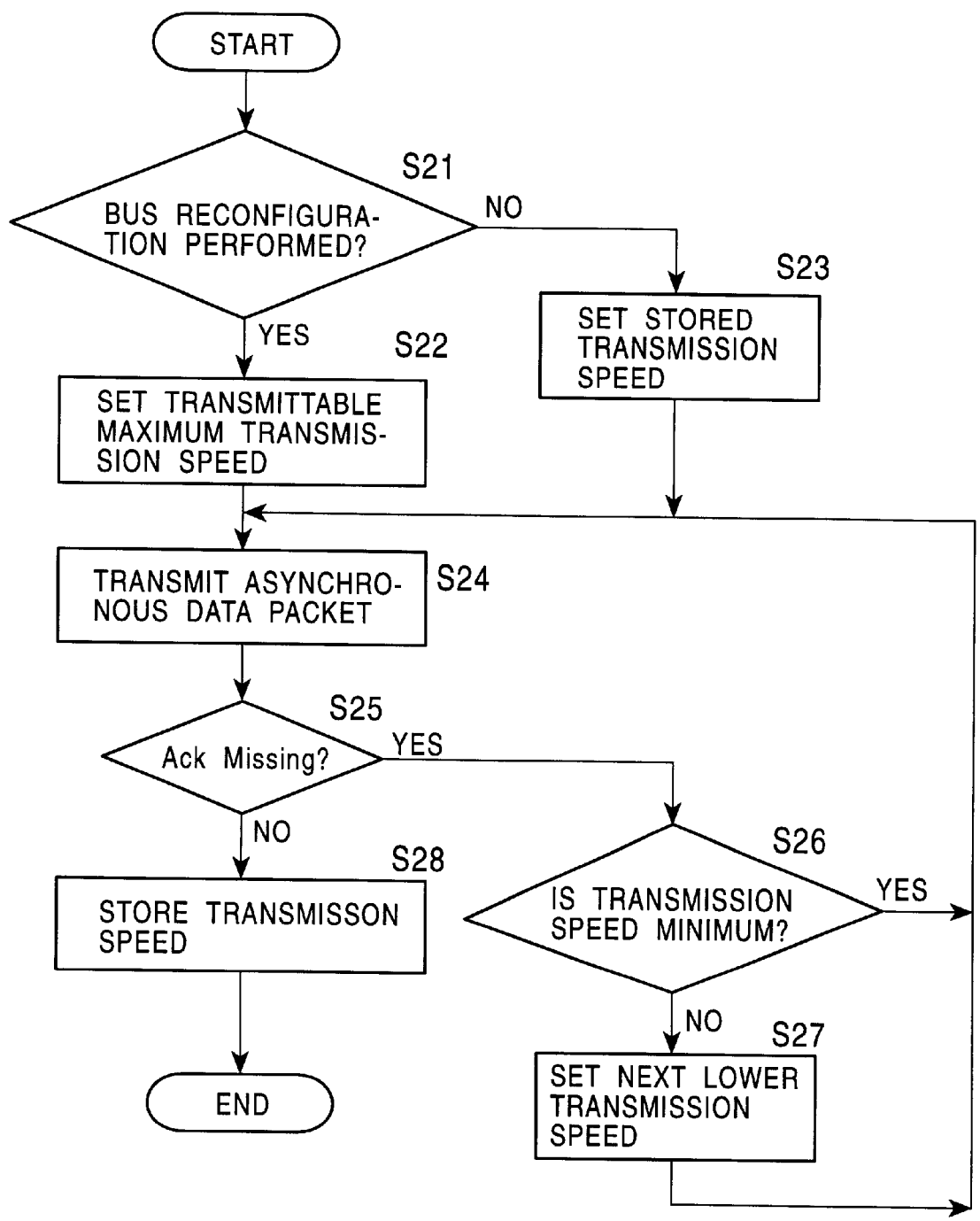
FIG. 18 is a flowchart illustrating another process for transmitting data in accordance with the invention.

FIG. 18 is a flowchart illustrating a similar method for performing asynchronous data transmission to another apparatus by a node such as digital VTR 3 connected to a data bus. This method is essentially a special case of the method of FIG. 17. That is, once a maximum transmission speed to a specific recipient device is determined, that speed is stored in a memory of the transmitting device, and used for future data transmissions to the specific recipient device. However, if a bus reconfiguration is performed, the speed information is erased from the memory. Typically, a bus reconfiguration is performed whenever a device is added to or removed from the bus.

The method of FIG. 18 assumes that the transmitting node maintains a memory, e.g., communication speed storage unit 34, containing stored transmission speeds for some or all of the other devices connected to the bus. That is, each entry for stored transmission speed associated with a recipient device is a maximum speed suitable for data transmission from the transmitting node to that recipient device. When a bus reconfiguration is performed, the speed information is cleared from the memory of each device connected to the bus. Once this occurs, the method of FIG. 18 may be performed immediately by each device connected to the bus (in sequence) so as to immediately establish suitable transmission speeds for subsequent communications. Alternatively, the method can be performed by a given device just prior to when it is desired to transmit data to an intended recipient device. In the latter case, the given device's memory containing the stored transmission speeds may remain partially or completely empty well after a bus reconfiguration has occurred, with the memory gradually becoming filled with speed information each time a data packet is transmitted to, and acknowledged by, another recipient device.

Accordingly, in step S21, the communication speed setting unit determines whether the reconfiguration of the serial bus has been executed. If it has, then in step S22 the communication speed setting unit 32 requests the serial bus controller 35 to set the maximum transmission speed at which transmission can be performed, e.g., S400. Otherwise, the routine proceeds to step S23, where the communication speed setting unit 32 reads from storage unit 34 a stored transmission speed corresponding to the target recipient device. This stored speed is a speed previously determined at which data transmission to the target recipient device can be performed. Speed setting unit 32 then requests the serial bus controller 35 to set the read transmission speed.

With the transmission speed thus set in accordance with either the stored transmission speed for the target recipient device or the maximum transmission speed of the transmitting node, the routine proceeds to step S24 where an asynchronous data packet is transmitted at the set speed. Steps S24 to S27 are the same as steps S12 to S15 of FIG. 17, and thus a description thereof is omitted. In step S25, if it has been determined that an acknowledge-packet has been received, the process proceeds to step S28. In step S28, the ACK-detecting unit 33 transmits, to the communication speed setting unit 34, a message requesting the communication speed setting unit 34 to store (or re-store) an entry for the recipient device that received the asynchronous data packet, and its transmission speed, i.e., the speed of the packet that was acknowledged. Thus, the stored speed is the speed at which data should be subsequently transmitted to the recipient device, and represents the maximum suitable speed for the subsequent transmission. This completes the process for the target recipient device, at which point asynchronous and/or isochronous data packets can be transmitted to the target recipient at the determined speed, or the routine can be repeated for another target recipient device.

As described above, by determining and storing a maximum transmission speed for an apparatus at a receiving end, a node such as the digital VTR 3 can transmit data to the apparatus rapidly at the maximum transmission speed at which data transmission can be performed. Thus, there is no need to employ a bus manager entity to determine optimum speeds for each node and to transmit such information to each node every time a bus reconfiguration occurs.

As stated earlier, the methods of FIGS. 17 and 18 establish the maximum transmission speeds for respective recipient devices by transmitting an asynchronous packet and receiving an acknowledgement. If isochronous data is to be subsequently transmitted to the recipient device, the same maximum speed information is preferably used for the isochronous transmission.

In the case where a node such as the digital VTR 3 is connected between two or more devices (e.g., the MD deck 5 and the server 8 shown in FIG. 19) and controls isochronous data communication between those devices, the above-described methods of the present invention are also applicable. For instance, the digital VTR may check and compare maximum asynchronous data communication speeds enabling satisfactory transmission for the two apparatuses.

This can be accomplished by means of the digital VTR transmitting data asynchronously to one device at a time as in the method of FIG. 17 to determine a maximum transmission speed to each device. The digital VTR may then send each of the two devices a message indicating what speed should be set when transmitting to the other device.

In the above description, the IEEE 1394 serial bus has been used as an example, but the present invention can be applied to other interfaces having similar features. The invention is even applicable to a protocol that allows data transmission over a bus at a speed anywhere within a certain range. In such a case, the methods of FIGS. 17 and 18 are performed in basically the same manner, starting at the high end of the range, and then gradually reducing the transmission speed in a step-wise manner by a predetermined amount as in step S15 or S27 until an acknowledgement is received.

The present invention also encompasses a storage medium, e.g., a CD-ROM, minidisk, floppy disk, etc., that stores a software program which is readable by processing circuitry of a node, such as by the CPU 25 of the digital VTR 3. The software program contains instructions for the processing circuitry to execute the above-described operations of FIGS. 17 and/or 18.

While the present invention has been described above in reference to preferred embodiments thereof, it is understood that these embodiments are merely exemplary and that one skilled in the art can make many changes to the disclosed embodiments without departing from the spirit and scope of the invention as defined by the appended claims.

What is claimed is:

1. A method for transmitting data by a transmitting device connected to an IEEE-1394-1995 serial data bus, comprising the steps of:
   (a) transmitting, by the transmitting device, a data packet onto said bus at a known speed, said data packet containing identification information of a target receiving end device connected to the bus;
   (b) detecting, by said transmitting device, whether an acknowledgement signal was sent by the receiving end device confirming receipt of the transmitted data packet;
   (c) if an acknowledgement signal is detected, setting, without the use of a bus manager, a transmission speed for a subsequent data transmission by the transmitting device to the target receiving end device at the transmission speed of said transmitting step; and
   (d) if no acknowledgement signal is detected, repeating step (a) at a reduced transmission speed and then repeating steps (b) and (c).

2. The method according to claim 1, wherein said known speed is initially set to a maximum speed at which said transmitting device is capable of transmitting data.

3. The method according to claim 1, wherein said acknowledgement signal, and said known speed are each in accordance with the IEEE 1394-1995 High Performance Serial Bus standard.

4. The method according to claim 1, further comprising storing said set transmission speed in a memory of said transmitting device in association with said receiving end device, and reading out said stored speed to be used as the speed for a subsequent data transmission to said receiving end device.

5. The method according to claim 4, further comprising repeating steps (a), (b), (c) and (d) for a second receiving end device, and storing said speed set for said second receiving end device in said memory in association therewith to be read out in conjunction with a subsequent data transmission to said second receiving end device.

6. The method according to claim 4, wherein said subsequent data transmission is an asynchronous data transmission.

7. The method according to claim 4, wherein said subsequent data transmission is an isochronous data transmission.

8. The method according to claim 1, wherein said steps (a), (b), (c), and (d) are performed following a bus reset operation of said bus.

9. The method according to claim 4, wherein said steps (a), (b), (c) and (d) are performed following a bus reset operation of said bus in which said memory is cleared of transmission speed information.

10. The method according to claim 1, wherein said acknowledgement signal is a multi-bit digital signal.

11. A method for transmitting data by a transmitting device connected to a data bus, comprising the steps of:
    (a) transmitting, by the transmitting device, a data packet onto said bus at a known speed, immediately after a successful arbitration for said bus by said transmitting device, said data packet containing identification information of a target receiving end device connected to the bus;
    (b) detecting, by said transmitting device, whether an acknowledgement signal was sent by the receiving end device confirming receipt of the transmitted data packet;
    (c) if an acknowledgement signal is detected, setting a transmission speed for a subsequent data transmission by the transmitting device at the transmission speed of said transmitting step; and
    (d) if no acknowledgement signal is detected, repeating step (a) at a reduced transmission speed and then repeating steps (b) and (c).

12. A method for transmitting data by a transmitting device connected to a data bus, comprising the steps of:
    (a) transmitting, by the transmitting device, a data packet onto said bus at a known speed, said data packet containing identification information of a target receiving end device connected to the bus;
    (b) detecting, by said transmitting device, whether an acknowledgement signal was sent by the receiving end device confirming receipt of the transmitted data packet;
    (c) if an acknowledgement signal is detected, setting a transmission speed for a subsequent data transmission by the transmitting device at the transmission speed of said transmitting step; and
    (d) if no acknowledgement signal is detected, repeating step (a) at a reduced transmission speed and then repeating steps (b) and (c);
       wherein said transmitting device is connected between at least two other devices connected to said bus, and controls data transmission between said at least two other devices.

13. The method according to claim 1, further comprising the steps of:
    (e) storing the set transmission speed in association with said receiving end device;
    (f) detecting if a bus reconfiguration has been executed due to a device being added to, or removed from, said bus; and
    (g) if a bus reconfiguration has been detected, erasing said stored transmission speed and repeating steps (a) to (e).

14. An information processing apparatus connectable to a bus, said information processing apparatus comprising:

data transmission means for transmitting data via said bus to a receiving end device connected to said bus;

detecting means for detecting an acknowledgement signal transmitted from the receiving end device confirming receipt of the transmitted data;

transmission-speed setting means for setting a data transmission speed for said data transmission means in accordance with a condition of the detection by said detecting means of said acknowledgement signal;

transmission-speed storage means for storing the set transmission speed in association with said receiving end device;

means for detecting if a bus reconfiguration has been executed due to a device being added to or removed from said bus; and means for erasing said stored transmission speed if a bus reconfiguration has been detected;

wherein in response to said bus reconfiguration detection, said data transmission means newly transmits data via said bus to a receiving end device, said detecting means newly detects an acknowledgement signal sent from said receiving end device, said transmission-speed setting means re-sets a data transmission speed responsive to the new detection by said detection means, and said transmission-speed storage means stores the re-set transmission speed.

15. The information processing apparatus according to claim 14, wherein said data transmission means is configured to transmit data using a plurality of transmission methods, and said set data transmission speed is used when transmitting data to said receiving end device using any one of said plurality of transmission methods.

16. The information processing apparatus according to claim 15, wherein said plurality of transmission methods comprise an asynchronous data transmission method and an isochronous data transmission method.

17. The information processing apparatus according to claim 14, wherein said apparatus is adapted to control data transmission between at least two other devices when connected to said bus between said at least two other devices.

18. An information processing method for an information processing apparatus connected to a bus, said information processing apparatus transmitting data to a receiving end apparatus via said bus, said information processing method including:

(a) transmitting data to said receiving end apparatus, which is connected to said bus;

(b) detecting an acknowledgement signal transmitted from the receiving end apparatus confirming receipt of the transmitted data;

(c) setting a data transmission speed for a subsequent data transmission in accordance with the condition of the detection of the acknowledgement signal;

(d) storing the set transmission speed in association with said receiving end device;

(e) detecting if a bus reconfiguration has been executed due to a device being added to, or removed from, said bus; and (f) if a bus reconfiguration has been detected, erasing said stored transmission speed and repeating steps (a) to (d).

19. A storage medium readable by a machine, tangibly embodying program instructions executable by the machine to carry out method steps for transmitting data by the machine operating as a transmitting device connected to an IEEE-1394 type serial data bus, said method steps comprising:

(a) transmitting, by the transmitting device, a data packet onto said bus at a known speed, said data packet containing identification information of a target receiving end device connected to the bus;

(b) detecting, by said transmitting device, whether an acknowledgement signal was sent by the receiving end device confirming receipt of the transmitted data packet;

(c) if an acknowledgement signal is detected, setting, without the use of a bus manager, a transmission speed for a subsequent data transmission by the transmitting device to the target receiving end device at the transmission speed of said transmitting step; and (d) if no acknowledgement signal is detected, repeating step (a) at a reduced transmission speed and then repeating steps (b) and (c).

20. The storage medium according to claim 19, wherein said known speed is initially set to a maximum speed at which said transmitting device is capable of transmitting data.

21. The storage medium according to claim 19, wherein said acknowledgement signal, and said known speed are each in accordance with the IEEE 1394-1995 High Performance Serial Bus standard.

22. A method for transmitting data by transmitting devices connected to a local serial data bus, comprising the steps of:

(a) transmitting, by a transmitting device, a data packet onto said bus at a known speed, said data packet containing identification information of a target receiving end device connected to the bus;

(b) detecting, by said transmitting device, whether an acknowledgement signal was sent by the receiving end device confirming receipt of the transmitted data packet;

(c) if an acknowledgement signal is detected, setting a transmission speed for a subsequent data transmission by the transmitting device to the target receiving device at the transmission speed of said transmitting step;

(d) if no acknowledgement signal is detected, repeating step (a) at a reduced transmission speed and then repeating steps (b) and (c);

(e) storing said set transmission speed in a memory of said transmitting device in association with said receiving end device, and reading out said stored speed to be used as the speed for a subsequent data transmission to said receiving end device;

(f) repeating steps (a), (b), (c) and (d) for a second receiving end device, and storing said speed set for said second receiving end device in said memory in association therewith to be read out in conjunction with a subsequent data transmission to said second receiving end device; and (g) repeating steps (a) to (f) for a second transmitting device connected to said serial data bus.

23. The method according to claim 22, wherein said bus, said acknowledgement signal, and said known speed are each in accordance with the IEEE 1394-1995 High Performance Serial Bus standard.

24. The method according to claim 23 wherein said transmission speed is set in step (c) without the use of a bus manager.

* * * * *